UNITED STATES PATENT OFFICE.

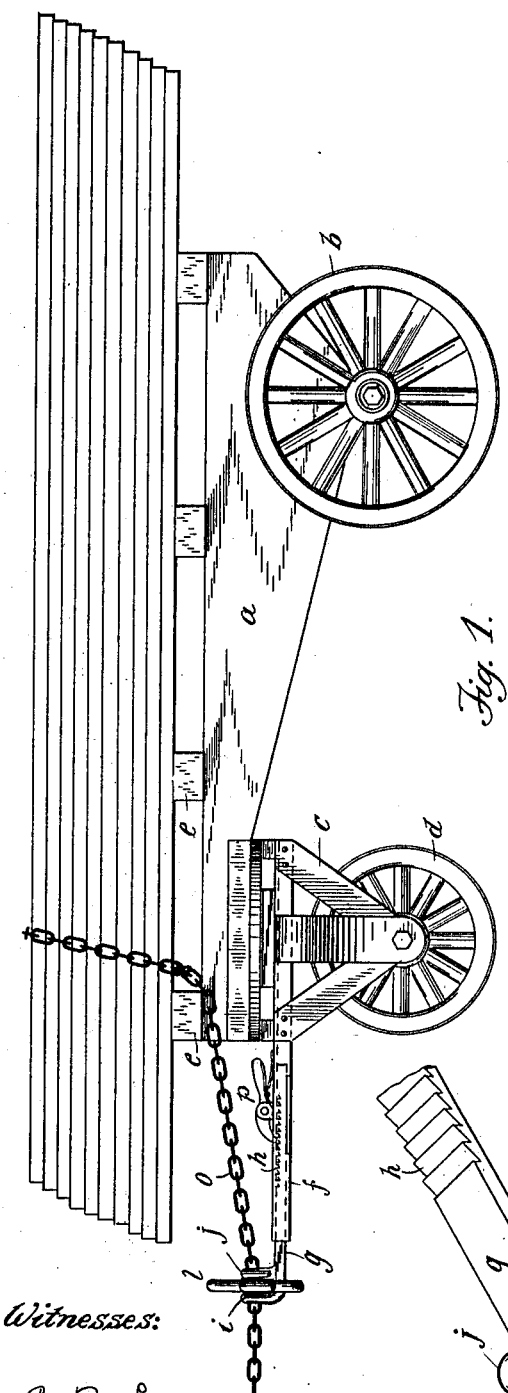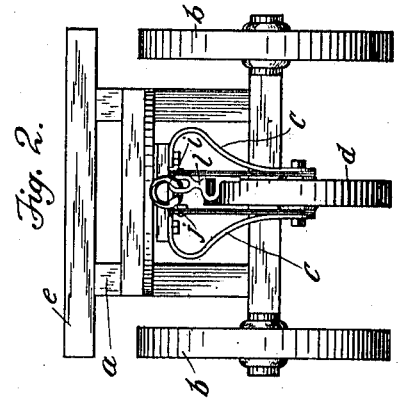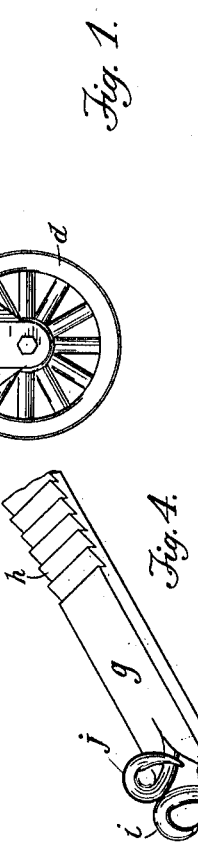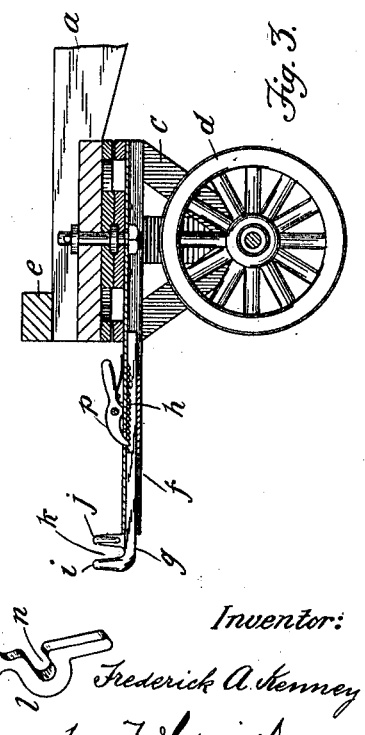

FREDERICK A. KENNEY, OF PORTLAND, OREGON, ASSIGNOR TO THE KENNEY TRUCK COMPANY, OF PORTLAND, OREGON, A CORPORATION OF OREGON.

LOAD-BINDER.

1,020,650.     Specification of Letters Patent.     Patented Mar. 19, 1912.

Application filed April 30, 1910. Serial No. 558,724.

*To all whom it may concern:*

Be it known that I, FREDERICK A. KENNEY, a citizen of the United States, and a resident of Portland, in the county of Multnomah and State of Oregon, have invented new and useful Improvements in Load-Binders, of which the following is a specification, reference being had to the accompanying drawings, forming a part thereof.

This invention relates to improvements in load binders, designed primarily for securing lumber on a wagon.

The object of the invention is to provide a load binder which may be quickly and conveniently operated in operation, and to simplify the parts to a minimum.

The invention also comprehends improvements in the details of construction and arrangement of parts which will be hereinafter described and particularly pointed out in the claims.

In the drawings: Figure 1 is an elevation of a wagon, illustrating the application of the invention. Fig. 2 is a front elevation of the same. Fig. 3 is a detail longitudinal section. Fig. 4 is a detail view of the slidable bar.

To illustrate the application of the invention, I have shown a conventional type of lumber wagon, comprising a body $a$, rear wheels $b$, front running gear $e$, front wheels $d$, and transverse bolsters $c$.

Extending from the running gear $c$, is a hollow tongue $f$, formed on its upper side with an opening, and adjacent therewith with ears. Pivoted between the ears, is a gravity pawl $p$ the end of which fits in the opening in the hollow tongue. Slidably mounted in the hollow tongue is a bar $g$, formed on the inner upper surface with ratchet teeth $h$, with which the pawl $p$ engage to hold the bar in fixed position when the binder is in use. The outer free end of the bar $g$ is formed with two spaced apart hooks $i$ and $j$, the free ends of which are arranged in alinement with each other to form a guide for a chain $o$. The space formed between the hooks form a seat for a latch bar $l$, and having an opening $m$ engaging the shank of the hook $i$, to provide a pivotal connection. The latch bar $l$, is formed on its under side with a notch or recess $n$, which when the said latch bar is in operative position, is in alinement with the guide formed by the two hooks.

In operation, the chain $o$, is passed around the lumber, and the free end is passed through the eyes of the hooks as shown in Fig. 1. Then the latch bar $l$ is thrown across the chain in the space $k$, the notch $n$, engaging over one of the links of the chain and preventing movement of the latter. The bar $g$ is now drawn outwardly to tighten the chain, the end of the pawl $p$, engaging with the teeth $h$, and preventing the tension of the chain pulling the bar back into the hollow tongue. To release the load the pawl $p$ is disengaged from the ratchet teeth, and the chain is thereby slackened and may be conveniently removed from the pile of lumber.

What I claim is:

1. In a load binder, the combination of a hollow tongue, a bar slidably mounted in the hollow tongue and provided at its outer free end with inwardly turned alined hooks to form a chain guide, said hooks being spaced apart to form a seat, a latch bar pivoted to the slidably mounted bar having a notch which when the latch bar is thrown into the space formed between the two hooks, is in alinement with the centers of said hooks to engage and lock a tying chain, and means on the hollow tongue to hold the slidable bar in adjusted position.

2. In a load binder the combination of a hollow tongue, a bar slidably mounted in said hollow tongue and provided on its face with ratchet teeth, a dog mounted on the hollow tongue to coöperate with the ratchet teeth, the slidably mounted bar having hooks arranged transversely parallel to each other and spaced apart, a chain passing through the hooks and adapted to engage and hold a pile of lumber, and means secured to the outer end of the slidable bar to engage with the links of the chain intermediate the hooks to hold the chain in fixed position.

3. In a load binder, the combination of a hollow tongue a bar slidably mounted in said tongue and provided on one face with ratchet teeth, a dog arranged to engage with the ratchet teeth, hooks on the outer end of the slidable bar, said hooks arranged transversely parallel to each other and spaced apart, a chain adapted to engage and hold a pile of lumber, one end of said chain passing through the hooks, and a latch bar secured to said slidable bar and comprising an eye at one end to removably engage one of the hooks, said latch bar having a recess to engage the links of the chain between the hooks.

FREDERICK A. KENNEY.

Witnesses:
GEORGE WALLACE,
C. B. LONG.

Copies of this patent may be obtained for five cents each, by addressing the "Commissioner of Patents, Washington, D. C."